United States Patent [19]

Kato et al.

[11] 4,371,664

[45] Feb. 1, 1983

[54] VINYL RESIN COMPOSITION CONTAINING SILYL GROUPS

[75] Inventors: Yasushi Kato; Hisao Furukawa, both of Kobe, Japan

[73] Assignee: Kanegafuchi Kagaku Kogyo Kabushiki Kaisha, Osaka, Japan

[21] Appl. No.: 302,546

[22] Filed: Sep. 16, 1981

[30] Foreign Application Priority Data

Sep. 19, 1980 [JP] Japan .................... 55-131146

[51] Int. Cl.$^3$ ............................................. C08F 8/00
[52] U.S. Cl. ................................. 525/100; 525/103; 526/279
[58] Field of Search ................ 525/103, 100; 526/279

[56] References Cited

U.S. PATENT DOCUMENTS

| | | | |
|---|---|---|---|
| 4,161,572 | 7/1979 | Yonezawa et al. | 525/100 |
| 4,181,687 | 1/1980 | Ward et al. | 525/100 |
| 4,191,713 | 3/1980 | Yonezawa et al. | 525/100 |
| 4,310,640 | 1/1982 | Kato et al. | 525/103 |

*Primary Examiner*—Melvyn I. Marquis
*Attorney, Agent, or Firm*—Moonray Kojima

[57] ABSTRACT

A composition comprising 100 parts by weight of a vinyl resin, and 0.01 to 10 parts by weight of a curing catalyst. The vinyl resin has a backbone chain composed substantially of a vinyl polymer, includes in each molecule at least one silyl group of which silicon links to a hydrolyzable group or groups, and contains 0.1 to 20% by weight of a carboxylic acid amide having a polymerizable group as a component of the polymer.

18 Claims, No Drawings

VINYL RESIN COMPOSITION CONTAINING SILYL GROUPS

BACKGROUND OF THE INVENTION

1. Field of the Invention

This invention relates to a composition which comprises a vinyl resin containing a hydrolyzable silyl group, and a curing catalyst.

2. Description of the Prior Art

There is known a vinyl resin containing a silyl group having a hydrolyzable group at its end or in its side chain, as disclosed in Japanese Laid-Open Patent Application No. 36395/79 filed by the assignee of the inventors of this invention. This vinyl resin has a lot of advantages. For example, it has a fine luster, and outstanding degrees of weatherability and color fastness, as is the case with all kinds of vinyl resins. Moreover, the hydrolyzable silyl group gives the resin an improved degree of adhesion to an inorganic substance, and allows it to undergo a crosslinking reaction even at ordinary room temperature with the aid of water, for example, in the air to form a dense network structure. This structure renders the resin excellent in solvent resistance, water resistance, heat resistance, hardness and weatherability.

There are known various kinds of compounds containing silyl groups linked to hydrolyzable groups. They are widely used to provide paints, coating agents, adhesives, sealants, silane coupling agents, and the like. As these compounds are likely to increase their viscosity gradually by reacting with water, they are kept away from water as far as possible when they are stored or used. It is, however, impossible to avoid their absorption of moisture from the air when they are repeatedly used, or the presence of water on the surface of the formulation prepared by adding a pigment or filler to any such compound. Thus, these compounds involve a serious problem in storage stability. Their storage stability is particularly low if they contain active hydrogen.

SUMMARY OF THE INVENTION

This invention provides a composition which comprises 100 parts by weight of a vinyl resin having a backbone chain consisting substantially of a vinyl polymer, including in each molecule at least one silyl group of which silicon links to a hydrolyzable group or groups, and containing 0.1 to 20% by weight of a carboxylic acid amide having a polymerizable group as a component of the polymer and 0.01 to 10 parts by weight of a curing catalyst.

The vinyl resin containing a silyl group of the formula

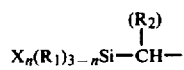

in which X stands for a hydrolyzable group, (R$_1$) and (R$_2$) each stand for a hydrogen atom, or an alkyl, aryl or aralkyl group having 1 to 10 carbon atoms, and n is 1, 2 or 3, is more easily curable, and higher in water and alkali resistance when cured, than a silicone-modified vinyl resin having a structural portion of the formula

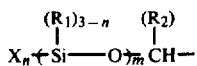

obtained by the condensation reaction of a compound of the formula

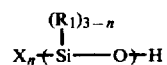

and a compound or polymer having a group of the formula

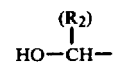

The former resin is curable even at ordinary room temperature, while the latter needs to be heated to at least 100° C. for curing.

The carboxylic acid amide having a polymerizable group contributes to improving the storage stability of the resin drastically. The resin remains stable even in the presence of several hundred parts per million of water. The amide has also been found to contribute to improving greatly the physical properties of the resin which has been cured. For example, the resin has an improved degree of adhesion. If the resin does not contain any such amide, it fails to show satisfactory adhesion to organic matter, despite its good adhesion to inorganic matter, as is the case with an ordinary silane coupling agent. The amide contributes to improving the adhesion of the resin to organic matter, while at the same time improving its adhesion to inorganic matter to a further extent. The composition of this invention is, therefore, not only useful for coating the surface of inorganic matter, but also widely applicable to organic substances, such as wood, paper and plastics, or for forming an overcoat on a layer of an organic paint. It has also been found that the composition has a prolonged pot life despite its exposure to the open atmosphere if cured with certain kinds of curing catalysts.

DETAILED DESCRIPTION OF THE INVENTION

The resin of this invention has a backbone chain consisting substantially of a vinyl polymer, includes at least one, or preferably at least two, silyl groups of which silicon links to hydrolyzable group or groups at the ends or in the side chains of each polymer, and contains 0.1 to 20% by weight of a carboxylic acid amide having a polymerizable group as a component of the polymer, and copolymerized with the vinyl polymer. The silyl groups are mostly represented by the formula:

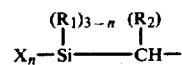

in which X stands for a hydrolyzable group, (R$_1$) and (R$_2$) each stand for a hydrogen atom, or an alkyl, aryl or aralkyl group having 1 to 10 carbon atoms, and n is an integer of 1 to 3. The hydrolyzable group may, for example, be halogen, alkoxy, acyloxy, ketoximate, amino, acid amino, aminoxy, mercapto, or alkenyloxy.

Although the silyl group-containing vinyl resin of this invention can be manufactured by a variety of methods, it is industrially effective to employ one of the following two methods, i.e., (A) hydrosilylation between a vinyl resin having a carbon-carbon double bond and a hydrosilane, and (B) copolymerization between a vinyl compound and a silyl compound having a polymerizable double bond. These two methods will hereunder be described in detail.

(A) The vinyl resin of this invention can be easily manufactured if a hydrosilane compound of the formula $$X_n-\underset{\underset{(R_1)_{3-n}}{|}}{Si}-H$$

is reacted with a vinyl resin having a carbon-carbon double bond in the presence of a Group VIII transition metal catalyst. In this formula, X stands for a hydrolyzable group, $(R_1)$ stands for a hydrogen atom, or a monovalent hydrocarbon group selected from among alkyl, aryl and aralkyl groups having 1 to 10 carbon atoms, and n is an integer of 1 to 3. Examples of the hydrosilane compound include halogenated silanes such as methyldichlorosilane, trichlorosilane and phenyldichlorosilane; alkoxysilanes such as methyldiethoxysilane, methyldimethoxysilane, phenyldimethoxysilane, trimethoxysilane and triethoxysilane; acyloxysilanes such as methyldiacetoxysilane, phenyldiacetoxysilane and triacetoxysilane; and other silanes, such as methyldiaminoxysilane, triaminoxysilane, methyldiaminosilane, triaminosilane, bis(dimethylketoximate)methylsilane, bis(cyclohexylketoximate)methylsilane, methyldiisopropenoxysilane and triisopropenoxysilane.

Although there is no particular limitation to the quantity of the hydrosilane compound, it is desirable to use 0.5 to 2.0 mols thereof per mol of the carbon-carbon double bonds in the vinyl resin. Any more hydrosilane may be used to be merely recovered without reacting with the vinyl resin.

The applicability of halogenated silanes is advantageous, since they are inexpensive, and highly reactive. A silyl group-containing vinyl resin obtained by employing a halogenated silane is curable rapidly upon exposure to air at ordinary room temperature, but generates hydrogen chloride. As hydrogen chloride sends off an irritating odor, and is corrosive to a base to which the compound is applied, it is desirable to convert the halogen functional group to another hydrolyzable functional group, such as alkoxy, acyloxy, aminoxy, amino, acid amide, ketoximate or mercapto, by a method, for example, disclosed in Japanese Laid-Open Patent Application No. 91546/79.

Any vinyl resin may be employed for reaction with a hydrosilane compound if it essentially contains a carboxylic acid amide having a polymerizable group. It is suitable to use a resin consisting mainly of a compound selected from among acrylic and methacrylic acid esters such as methyl acrylate, methyl methacrylate, ethyl acrylate, ethyl methacrylate, butyl acrylate, butyl methacrylate, 2-ethylhexyl acrylate and 2-ethylhexyl methacrylate, carboxylic acids such as acrylic acid, methacrylic acid, itaconic acid and fumaric acid, acid anhydrides such as maleic anhydride, epoxy compounds such as glycidyl acrylate or methacrylate, amino compounds such as diethylaminoethyl acrylate or methacrylate, and aminoethylvinyl ether, and copolymers such as acrylonitrile, iminole methacrylate, styrene, α-methylstyrene, vinyl chloride, vinyl acetate and vinyl propionate. Any copolymeric component containing carboxylic acid, acid anhydride, epoxy, amino or like groups should, however, be employed in a quantity not exceeding 5% by weight, since it is likely to have an adverse effect on the storage stability of the product, though it contributes to improving its adhesive property.

The vinyl resin obtains the carbon-carbon double bonds required for hydrosilylation, if allyl acrylate or methacrylate, diallyl phthalate, or the like is incorporated by radical copolymerization during the manufacture of a vinyl compound or copolymer. The quantity of the monomers depends on the number of the silyl groups sought to be provided in the resin intended. A chain transfer agent, such as n-dodecylmercaptane or t-dodecylmercaptane, may be added to control the molecular weight of the resin, if required. A solvent may or may not be used for the polymerization of any such vinyl compound. If any solvent is to be used, it is desirable to use an unreactive solvent selected from among ethers, hydrocarbons and acetic acid esters.

The carboxylic acid amide having a polymerizable group may, for example, be acrylic or methacrylic amide, itaconic acid diamide, α-ethylacrylic amide, crotonic acid amide, fumaric acid amide, or maleic acid diamide. The silyl group-containing vinyl resin of this invention may contain 0.1 to 20%, or preferably 0.5 to 10%, by weight of any such amide.

The reaction of the hydrosilane compound with the carbon-carbon double bond in the vinyl resin requires a transition metal complex catalyst. An effective catalyst may be selected from among the Group VIII transition metal complex compounds of platinum, rhodium, cobalt, palladium and nickel. The hydrosilylation may be accomplished at a temperature of 50° C. to 150° C., and require a period of 1 to 10 hours.

(B) The silyl group-containing vinyl resin of this invention can alternatively be manufactured if a vinyl compound is radically polymerized with a silane compound of the formula $$(R_2)-\underset{\underset{(R_1)_{3-n}}{|}}{Si}-X_n$$

in which $(R_1)$ stands for a monovalent hydrocarbon group selected from among alkyl, aryl and aralkyl groups having 1 to 10 carbon atoms, $(R_2)$ stands for an organic residue having a polymerizable double bond, n is an integer of 1 to 3, and X stands for a hydrolyzable group.

Suitable examples of the silane compound include:

$$CH_2=CHSi(OCH_3)_2, \quad CH_2=CHSiCl_2,$$
$$\overset{|}{CH_3} \qquad \overset{|}{CH_3}$$

$$CH_2=CHSi(OCH_3)_3, \quad CH_2=CHSiCl_3,$$

$$CH_2=CHCOO(CH_2)_3\underset{\underset{CH_3}{|}}{Si}(OCH_3)_2,$$

$$CH_2=CHCOO(CH_2)_2Si(OCH_3)_2,$$

$$CH_2=CHCOO(CH_2)_2\underset{\underset{CH_3}{|}}{Si}Cl_2,$$

$$CH_2=CHCOO(CH_2)_2SiCl_2, \quad CH_2=C(CH_2)COO(CH_2)_2\underset{\underset{CH_2}{|}}{Si}(OCH_3)_2,$$

$$CH_2=C(CH_2)COO(CH_2)_2Si(OCH_3)_3,$$

$$CH_2=C(CH_2)COO(CH_2)_2\underset{\underset{CH_3}{|}}{Si}Cl_2,$$

-continued

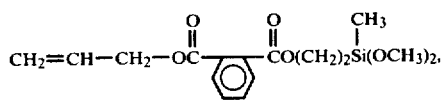

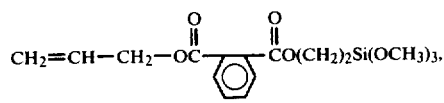

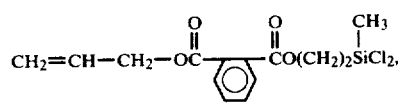

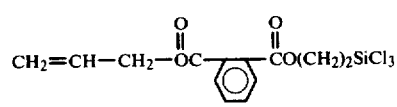

These silane compounds can be prepared by a variety of methods. For example, it is possible to react acetylene, allyl acrylate or methacrylate, or diallyl phthalate with methyldimethoxysilane, methyldichlorosilane, trimethoxysilane or trichlorosilane in the presence of a Group VIII transition metal catalyst.

Any vinyl compound that is used in accordance with the method 'A' can be used according to the method 'B.' In addition, it is possible to use in accordance with the method 'B' a vinyl compound containing a hydroxyl group, such as 2-hydroxyethyl acrylate or methacrylate, 2-hydroxypropyl acrylate or methacrylate, 2-hydroxyvinyl ether, N-methylolacrylic amide, or ARONIX 5700 (product of Toa Gosei Kagaku Kogyo, Japan). Any copolymeric component containing a carboxylic acid, acid anhydride, epoxy, amino or hydroxyl group should, however, be employed in a quantity not exceeding 5% by weight, as is the case with the method 'A.'

An ordinary process for solution polymerization may be employed for manufacturing a copolymer of the vinyl and silane compounds. The vinyl and silane compounds are reacted with each other in the presence of a radical polymerization initiator at a temperature of 50° C. to 150° C. A chain transfer agent, such as n- or t-dodecylmercaptane, may be added if required for controlling the molecular weight of the resulting silyl group-containing copolymer. Alternatively, the molecular weight of the copolymer can be controlled if the quantity of the catalyst or the reaction temperature is appropriately altered. A solvent may or may not be employed. If any solvent is to be employed, it is desirable to use an unreactive solvent selected from among ethers, hydrocarbons and acetic acid esters.

The silyl group-containing vinyl resin obtained as hereinabove described may have its hydrolyzable group converted to another hydrolyzable group by, for example, a method as described in Japanese Laid-Open Patent Application No. 91546/79.

Although the silyl group-containing vinyl resin prepared as hereinabove set forth has an outstanding degree of storage stability, its storage stability is lowered under certain conditions if it has too high a molecular weight. Accordingly, the resin preferably has a molecular weight of 1,000 to 30,000, if it contains a lot of silyl groups per molecule, or in the event a pigment containing a lot of water, such as transparent iron oxide, is dispersed in the resin to form an enamel. The resin preferably contains one silyl group per molecular weight of 300 to 7,000.

The resin of this invention can be cured with any ordinary curing catalyst. It is, for example, possible to use an acid catalyst such as phosphoric acid or p-toluenesulfonic acid; a metal carboxylate such as tin octylate, tin dibutyl dilaurate, tin dioctyl dilaurate or lead octylate; an amine such as tetraethylenepentamine, triethylenediamine, or N-$\beta$-aminoethyl-$\gamma$-aminopropyltrimethoxysilane; or an alkali catalyst such as potassium hydroxide or sodium hydroxide. It is desirable to use 0.01 to 10 parts by weight of the catalyst per 100 parts by weight of the polymer. As the vinyl resin of this invention contains a carboxylic acid amide having a polymerizable group, however, it has a short pot life in the open atmosphere in the presence of a curing catalyst, if it contains a silyl group having three hydrolyzable groups. The short pot life is particularly objectionable when the resin is used to form a coating agent, paint, or the like. The storage stability or pot life of the resin can be improved or prolonged in accordance with this invention by a number of methods, as follows:

1. It is effective to use any of the following curing catalysts:

(1) An organic tin compound in mercaptide or sulfide form having a Sn—S or Sn=S bond. More specifically, $R_2Sn(S—COO)$ type compound, such as $(n—C_4H_9)_2Sn(SCH_2COO)$ or $(n—C_6H_{17})_2Sn(SCH_2CH_2COO)$; $R_2Sn(S—S)$ type compound, such as $(n—C_8H_{17})_2Sn(SCH_2COOCH_2C-H_2OCOCH_2S)$ or $(n—C_8H_{17})_2Sn(SCH_2COOCH_2CH_2CH_2CH_2OCOCH_2S)$; $R_2Sn(SCH_2COOR)$ type compound, such as $(n—C_4H_9)_2Sn(SCH_2COOC_8H_{17}-iso)_2$ or $(n—C_8H_{17})_2Sn(SCH_2COOC_{12}H_{25-n})_2$; $RSn(SCH_2COOR)_3$ type compound, such as $(n—C_4H_9)Sn(SCH_2COOC_8H_{17}-iso)_3$; $R_2Sn=S$ compound, such as $(n—C_8H_{17})_2Sn=S$; or the like.

(2) A mixture of a carboxylic acid type organic tin compound with an organic tin compound in mercaptide or sulfide form of the type listed at (1) above. Examples of the carboxylic acid type organic tin compound include $(n—C_8H_9)_2Sn(OCOC_{11}H_{23}—n)_2$, $(n—C_4H_9)_2Sn-(OCOCH=CHCOOCH_3)_2$, $(n—C_8H_{17})_2Sn-(OCOC_{11}H_{23}—n)_2$, $(n—C_8H_{17})_2Sn(OCOCH=CH-COOC_4H_9—n)_2$, and $Sn(OCOC_8H_{17}—n)$. The carboxylic acid type compound and the mercaptide or sulfide may have a mixing ratio of 1:0.1 to 20, or preferably, 1:0.1 to 10.

(3) A mixture of a carboxylic acid type organic tin compound with an organic carboxylic acid, or acid anhydride. Suitable examples of the organic carboxylic acid, and acid anhydride include benzoic acid, phthalic acid, succinic acid, adipic acid, pyromellitic acid, formic acid, acetic acid, maleic acid, acetic anhydride, maleic anhydride, phthalic anhydride, succinic anhydride, and pyromellitic acid dianhydride. As regards the carboxylic acid type compound, it is possible to use any of those listed at (2) above, except the stannous compounds, such as $Sn(OCOC_8H_{17}—n)$, which should be avoided, since they form a sediment. The carboxylic acid type tin compound, and the organic carboxylic acid or acid anhydride may have a mixing ratio of 1:0.1 to 20, or preferably, 1:0.1 to 10.

(4) An organic carboxylic acid, or acid anhydride selected from those listed at (3) above.

(5) An organic amine compound selected from among, for example, aliphatic monoamines such as butylamine, diethylamine and triethylamine; aliphatic polyamines such as triethylenediamine and tetraethylenepentamine; alicyclic amines such as piperidine and piperazine; aromatic amines such as metaphenylenediamine; and ethanolamines. It is also possible to use various kinds of modified amines, polyamide resins, or other compounds which are usually used for curing epoxy resins. It is further possible to use γ-aminopropyltriethoxysilane, N-β-(aminoethyl)-γ-aminopropyltrimethoxysilane, or the like.

2. Alternatively, the resin of this invention has a prolonged pot life if it contains as a copolymeric component a polymerizable compound having a carboxylic acid group, such as acrylic or methacrylic acid, and an acid anhydride group, such as maleic anhydride, in addition to a carboxylic acid amide having a polymerizable group. From the standpoint of storage stability, however, the quantity of the compound containing a carboxylic acid group and an acid anhydride group is preferably in the range of 0.1 to 5% by weight.

3. A prolonged pot life can also be obtained if a hydrolyzable silyl group-containing vinyl resin containing a polymerizable compound having a carboxylic acid group, such as acrylic or methacrylic acid, and an acid anhydride group, such as maleic anhydride, but not containing any carboxylic acid amide having a polymerizable group is mixed into the vinyl resin of this invention containing a carboxylic acid amide having a polymerizable group. From the standpoint of storage stability, however, the quantity of the compound having a carboxylic acid group and an acid anhydride group in the former resin is preferably in the range of 0.1 to 5% by weight based on the total weight of the two resins which are mixed together.

The composition of this invention, which comprises a silyl group-containing vinyl resin, and a curing catalyst, is useful in preparing a paint or coating agent, since it is curable at a low temperature, and even at ordinary room temperature. In fact, it is rapidly curable at ordinary room temperature, and forms a coated film having a highly lustrous surface, as will hereinafter be set forth in several examples of this invention. It is possible to improve the physical properties, such as hardness, of the coated surface to a further extent if ethyl silicate, various kinds of silane coupling agents, or other substances capable of co-condensation with the vinyl resin of this invention are added thereinto. The resin of this invention can also be blended into a known resinous paint or coating agent, such as a lacquer, an acrylic lacquer, a thermosetting acrylic paint, an alkyd resin paint, a melamine resin paint, or an epoxy resin paint, in an appropriate proportion thereto to improve the adhesive nature, weatherability, or other physical properties of any such known paint, or coating agent.

The composition of this invention can be mixed with various kinds of fillers, pigments, or the like, for example, various types of silica, calcium carbonate, magnesium carbonate, titanium oxide, iron oxide, and glass fibers. This feature renders the composition useful for coating or sealing purposes on airplanes, buildings, automobiles, glass, or the like, or for the surface treatment of various kinds of inorganic substances. By virtue of its high adhesiveness to both inorganic and organic substances, the silyl group-containing vinyl resin of this invention is useful for bonding inorganic substances, organic substances, and particularly inorganic and organic substances, or for improving the adhesion therebetween.

The invention will now be described more specifically with reference to examples.

EXAMPLE 1

A solution of 2 g azobisisobutyronitrile dissolved in a mixture of 30 g of styrene, 16 g of allyl methacrylate, 20 g of methyl methacrylate, 19 g of n-butyl methacrylate, 14 g of butyl acrylate, 2 g of maleic anhydride, 4 g of acrylic amide, 2 g of n-dodecylmercaptan, and 10 g of n-butanol were added dropwise into 90 g of a xylene solvent heated to 90° C. They were react for 10 hours to yield a vinyl polymer having a molecular weight of 8,000, and containing an unsaturated allyl group. The infrared absorption spectrum of the polymer indicated absorption by the carbon-carbon double bond at 1648 cm$^{-1}$, and absorption by the acid anhydride at 1780 cm$^{-1}$.

40 g of the solvent, and the majority of the n-butanol were removed from the polymer solution under reduced pressure. An isopropanol solution containing 1.5 g of methyldimethoxysilane and 0.0005 g of chloroplatinic acid was added into the resulting vinyl copolymer solution, and they were reacted at 90° C. for six hours in a tightly closed container, whereby there was obtained a vinyl polymer having a silyl group. The infrared absorption spectrum of this polymer ceased to indicate any absorption at 1648 cm$^{-1}$.

EXAMPLE 2

Asolution of 2 g of azobisisobutyronitrile dissolved in a mixture of 30 g of styrene, 22 g of γ-methacrylopropyltiributyl methacrylate, 18 g of butyl acrylate, 4 g of acrylic amide, 1 g of n-dodecylmercaptan, and 10 g of n-butanol were added dropwise into 100 g of xylene heated to 90° C. They were reacted for 10 hours to yield a silyl group-containing vinyl polymer having a molecular weight of 11,000.

EXAMPLE 3

A solution of 8 g of azobisisobutyronitrile dissolved in a mixture of 30 g of styrene, 22 of methyl methacrylate, 20 g of γ-methacryloxypropyltrimethoxysilane, 15 g of n-butyl methacrylate, 18 g of butyl acrylate, 4 g of acrylic amide, and 10 g of n-butanol were added dropwise into 100 g of xylene heated to 120° C. They were reacted for 10 hours to yield a silyl group-containing vinyl polymer having a molecular weight of 5,500.

EXAMPLE 4

The procedures of EXAMPLE 3 were repeated, except that 3 g of acrylic amide and 1 g of maleic anhydride were used instead of 4 g of acrylic amide. There was obtained a silyl group-containing vinyl polymer having a molecular weight of 6,000.

EXAMPLE 5

The procedures of EXAMPLE 3 were repeated, except that 4 of maleic anhydride were used instead of 4 g of acrylic amide. There was obtained a silyl group-containing vinyl polymer having a molecular weight of 5,800.

COMPARATIVE EXAMPLE 1

The procedures of EXAMPLE 2 were reapted, except that no acrylic amide was employed, whereby there was prepared a silyl group-containing vinyl polymer.

Each of the polymer solutions obtained in EXAMPLES 1 to 5 and COMPARATIVE EXAMPLE 1, and titanium oxide were mixed together in a ball mill to obtain a solid weight ratio of 1:1 to form a white enamel. The catalysts as shown in TABLE 1 were added into these enamels, and they were diluted with xylene until their viscosity was lowered to a level suitable for coating (15 seconds on a Ford cup). Each of the diluted enamels was tested for its pot life in an open container. The solvent resistance of the coated films of each enamel was examined. A coated film of each enamel was formed on a mild steel plate, and another coated film on a film of a nitrocellulose lacquer surfacer applied to a mild steel plate. These films were heated at 60° C. for 40 minutes, and after they had been left for one day, their solvent resistance was examined. The Q610: Epoxy resin curing agent manufactured by Mitsui Petrochemical Epoxy Co., Ltd., Japan;
OTM: Dioctyltin dimaleate;
Stann ONJ-IF: Stabilizer for polyvinyl chloride manufactured by Sankyo Organic Co., Ltd. (a mixture of a carboxylic acid type tin compound and a mercaptide type tin compound);
Stann JF-9B: Stabilizer for polyvinyl chloride manufactured by Sankyo Organic Co., Ltd., Japan (a mercaptide type tin compound);
DTL: Dibutyltin dilaurate.

As is obvious from TABLE 1, the vinyl resin of this invention exhibits excellent physical properties of its coated films on both mild steel plates and films of a lacquer surfacer, a greatly improved pot life depending on the catalyst employed, and an outstanding degree of storage stability.

TABLE 1

| | Catalyst (Parts per 100 parts of resin) | Pot life | Physical properties of coated film | | | Pencil hardness | Storage stability | |
| | | | Base | Spot test for solvent resistance | | | Initial viscosity (cps) | Viscosity after one month (cps) |
| | | | | Toluene | Lacquer thinner | | | |
|---|---|---|---|---|---|---|---|---|
| Example 1* | Q610 (3) | At least 10 hours | Mild steel plate | o | — | F | 250 | 400 |
| " | " | At least 10 hours | Lacquer surfacer | o | — | B | " | " |
| Example 2* | Stann ONJ-1F (3) | At least 10 hours | Mild steel plate | o | — | F | 255 | 320 |
| " | Stann ONJ-1F (3) | At least 10 hours | Lacquer surfacer | o | — | B | " | " |
| " | Stann JF-9B (3) | At least 10 hours | Mild steel plate | o | — | F | " | " |
| " | Stann JF-9B (3) | At least 10 hours | Lacquer surfacer | o | — | B | " | " |
| Comparative Example* | Stann JF-9B (3) | At least 10 hours | Mild steel plate | o | — | F | 255 | 400 |
| Comparative Example* | Stann JF-9B (3) | At least 10 hours | Lacquer surfacer | — | x | 2B | " | " |
| Example 3 | DTL (3) and phthalic acid (1) | At least 10 hours | Mild steel plate | o | — | H | 215 | 240 |
| " | DTL (3) and phthalic acid (1) | At least 10 hours | Lacquer surfacer | o | — | B | " | " |
| Example 4 | OTM (3) | At least 10 hours | Lacquer surfacer | o | — | B | 200 | 600 |
| Mixture of polymer solutions obtained in Examples 3 and 5 in a mixing ration of 4:1 (solids) | " | At least 10 hours | Lacquer surfacer | o | — | B | | | storage stability of the polymer solutions obtained in EXAMPLES 2 and 3 was examined. After 3,000 ppm of water had been added into each solution, it was left at 50° C. for one month in a tightly closed container, and its change in viscosity was examined. The results are shown in TABLE 1, in which:

*Seven parts by weight of ethyl silicate were contained per 100 parts by weight of the resin;

Spot Test for Solvent Resistance: A drop of toluene or a lacquer thinner was let to fall on the surface of each coated film, and the film was examined for any change. The results are shown by the following symbols:
o: The film did not show any change;
Δ: It showed a slight change; or
x: It swelled, or peeled off.

What is claimed is:

1. A composition comprising 100 parts by weight of a vinyl resin having a backbone chain composed substantially of a vinyl polymer, including in each molecule at least one silyl group of which silicon links to a hydrolyzable group or groups, and containing 0.1 to 20% by weight of a carboxylic acid amide having a polymerizable group as a component of the polymer and 0.01 to 10 parts by weight of a curing catalyst.

2. A composition as set forth in claim 1, wherein said vinyl resin has a molecular weight of 1,000 to 30,000.

3. A composition as set forth in claim 1, wherein said curing catalyst comprises an organic tin compound in mercaptide form having a Sn—S bond.

4. A composition as set forth in claim 1, wherein said curing catalyst comprises an organic tin compound in sulfide form having a Sn=S bond.

5. A composition as set forth in claim 1, wherein said curing catalyst comprises a mixture of a carboxylic acid type organic tin compound and a mercaptide type organic tin compound having a Sn—S bond, said tin compounds having a mixing ratio of 1:0.1 to 20.

6. A composition as set forth in claim 1, wherein said curing catalyst comprises a mixture of a carboxylic acid type organic tin compound and a sulfide type organic tin compound having a Sn=S bond, said tin compounds having a mixing ratio of 1:0.1 to 20.

7. A composition as set forth in claim 1, wherein said curing catalyst comprises a mixture of a carboxylic acid type organic tin compound and an organic carboxylic acid having a mixing ratio of 1:0.1 to 20.

8. A composition as set forth in claim 1, wherein said curing catalyst comprises a mixture of a carboxylic acid type organic tin compound and an organic carboxylic acid anhydride having a mixing ratio of 1:0.1 to 20.

9. A composition as set forth in claim 1, wherein said curing catalyst comprises an organic carboxylic acid.

10. A composition as set forth in claim 1, wherein said curing catalyst comprises an organic carboxylic acid anhydride.

11. A composition as set forth in claim 1, wherein said curing catalyst comprises an organic amine compound.

12. A composition as set forth in claim 1, wherein said vinyl resin further contains 0.1 to 5% by weight of an acid anhydride having a polymerizable group.

13. A composition as set forth in claim 1, wherein said vinyl resin further contains 0.1 to 5% by weight of a carboxylic acid having a polymerizable group.

14. A composition as set forth in claim 1, wherein said vinyl resin comprises a mixture of a silyl group-containing vinyl resin containing a carboxylic acid amide having a polymerizable group, and a silyl group-containing vinyl resin containing a carboxylic acid or acid anhydride having a polymerizable group, said carboxylic acid or acid anhydride occupying 0.1 to 5% by weight of the solids in said mixture.

15. A composition as set forth in claim 1, wherein said silyl group is represented by the general formula

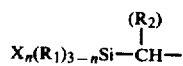

where X stands for a hydrolyzable group, $(R_1)$ and $(R_2)$ each stand for a hydrogen atom, or an alkyl, aryl or aralkyl group having 1 to 10 carbon atoms, and n is an integer of 1 to 3.

16. A paint comprising a composition of claim 1.

17. A paint as set forth in claim 16, wherein said hydrolyzable group is a methoxy group.

18. A paint as set forth in claim 16, wherein said vinyl resin has a molecular weight of 300 to 2,000 per silyl group.

* * * * *